United States Patent Office 3,454,619
Patented July 8, 1969

3,454,619
PRODUCTION OF ADIPONITRILE
William B. Hayes, Odessa, Tex., assignor to El Paso Products Company, Odessa, Tex., a corporation of Texas
No Drawing. Filed Oct. 19, 1966, Ser. No. 587,683
Int. Cl. C07c *121/12, 121/10, 121/26*
U.S. Cl. 260—465.2                            9 Claims

ABSTRACT OF THE DISCLOSURE

Vaporizing adipic acid, preferably in the form of diammonium adipate, in the presence of ammonia, preferably in the form of aqueous ammonia, and co-reacting these vaporized materials in the presence of a calcium phosphate catalyst and at a temperature of 500° to 800° F. to form adiponitrile.

---

This invention relates to the production of adiponitrile and, more particularly, to a catalytic process for the production of adiponitrile from adipic acid and its ammoniated carboxylic derivatives.

Adiponitrile, as is well known, is an important commercial intermediate for the production of certain grades of nylon and, therefore, a great deal of effort has been expended to devise suitable processes for its production. One of the most satisfactory and succesfsul processes developed heretofore involves the reaction of adipic acid with ammonia in the presence of a catalytic material to form the adiponitrile. However, these prior processes have not been entirely satisfactory from a commercial standpoint in view of the fact that the reactants present and materials formed tend to shorten the life of the catalytic material and also give rise to a variety of side reactions which tend to reduce the yield of desired product. Accordingly, no satisfactory process has been devised heretofore which can be said to be completely satisfactory.

Of these prior processes, the most common accepted have been carried out by reacting adipic acid or its ammoniated derivatives with ammonia over a dehydrating catalyst material. Various catalytic materials have been employed heretofore as the dehydrating catalysts with the most successful involving silica gel catalysts and boron phosphate catalysts, as these materials were found to present the greatest overall yield and conversion characteristics in conjunction with the availability and costs of the catalysts.

However, processes employing these catalysts have continuously been subject to objection inasmuch as these catalytic materials employed are subject to shortened catalyst life by reason of deterioration and carbonization, which factors make it imperative that the equipment in which the reactions are carried out be shut down for cleaning and reactivation of the catalysts and thus increase the expenses in producing the adiponitrile by the requirement for such additional steps. It is, therefore, to be appreciated that a process which overcomes these disadvantages will find widespread acceptance in the art of producing adiponitrile.

It is according to one object of this invention to provide a process for the production of adiponitrile which overcomes or otherwise bviates the disadvantages now known to such processes in the prior art.

It is a further object of this invention to provide a process for the production of adiponitrile by the reaction of adipic acid with ammonia wherein a calcium phosphate catalyst is employed.

A still further object of the invention is to provide methods for producing adiponitrile by the vapor phase reaction of adipic acid or its ammoniated derivatives with ammonia in the presence of a calcium phosphate catalyst system wherein the catalyst is subject to very limited carbonization of deterioration during the reaction.

Other objects and advantages of the present invention will become apparent as the description thereof proceeds.

In accordance with this invention and in satisfaction of the above objects and advantages it has been found that adiponitrile may be produced by the vapor phase reaction of adipic acid and its derivatives with an excess of ammonia in the presence of a catalyst which comprises compounds of calcium and phosphorous.

It has been found according to this invention that the use of the catalyst system disclosed herein gives rise to increased conversions of adipic acid to the desired adiponitrile while simultaneously extending substantially the catalyst life by being subject to very limited carbonization on the surface of the catalyst with resultant deterioration thereof during the reaction. It is thus to be appreciated that the calcium phosphate catalyst disclosed herein for use in the process permits the maintenance of high selectivities to the desired adiponitrile from adipic acid while not being subject to the objectionable deterioration and carbonization which have characterized dehydrating catalysts employed in this reaction heretofore in this reaction. Therefore, a catalytic system which prevents periodic shutdowns of equipment for cleaning and catalytic reactivation will find wide acceptance in the adiponitrile art by decreasing the technical problems associated with this reaction and thereby decreasing the cost in producing the adiponitrile.

As pointed out, the reaction with the catalytic system of this invention as employed, involves the use of adipic acid or its ammoniated derivatives with ammonia. Adipic acid is, of course, a well known dicarboxylic acid and may be illustrated by the following structural formula:

I   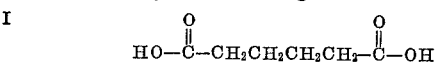

Of the adipic acid derivatives which may be employed in the process of this invention, there may be mentioned diammonium adipate, which is formed when adipic acid is dissolved in ammonia. However, it is to be understood that other adipic acid derivatives which form adiponitrile using the catalyst of this invention may also be employed.

The adipic acid is reacted with an excess of ammonia to ensure that sufficient ammonia is present to ensure that the reaction carries to completion. In the preferred embodiment of the reaction, it has been found that the ammonia reactant should be present in a molar excess of about 30 to 1 as this ratio has been found conducive to supply sufficient ammonia to ensure that the reaction will go to completion.

The calcium phosphate catalyst, which forms the basic novelty of this invention, comprises catalysts containing compounds of calcium and phosphorous such as tricalcium phosphate, calcium pyrophosphate, dicalcium phosphate and the like. Particularly suitable catalysts for use in the process have been found to be tricalcium phosphate [Ca$_3$(PO$_4$)$_2$] and calcium pyrophosphate (Ca$_2$P$_2$O$_7$) and the use of these materials constitute preferred embodiments. These catalytic materials, when employed in the reaction of this invention, have been found to provide high selectivities to adiponitrile and excellent conversions of the adipic acid while simultaneously being characterized by long catalyst life. This unexpected benefit of the calcium phosphate catalysts is attributable to the observance that no loss of the phosphate content of the catalyst occurs and carbonization on the face of the catalyst occurs only to a very limited extent. This latter characteristic is common in prior art catalysts and serves to blind the active surface and limit the useful life of the catalyst. It is thus to be appreciated that the catalysts of this invention obviate the shortcomings of the prior art catalysts employed in the reaction of this invention.

Calcium phosphate and its various forms are well known prior art materials and are available commercially. Hence, their method of production need not be described here.

The process by which the adipic acid and ammonia are reacted in the presence of the calcium phosphate catalyst is carried out at an elevated temperature and preferably at a temperature of about 500° to 800° F. and more preferably at a temperature of 575° to 675° F. This latter range of temperature represents a preferred range at which the reaction of this invention may be carried out in the vapor phase.

The pressure to be maintained in the reaction system may be atmospheric, superatmospheric, or subatmospheric as desired, the pressure, of course, depending upon the temperature employed and other conditions of the reaction. However, in a preferred embodiment, the reaction is carried out at atmospheric pressure.

It has been found that carrying out the reaction of adipic acid and ammonia to form adiponitrile according to the process of this invention gives rise to conversions of adipic acid of greater than 75% with selectivities to adiponitrile being greater than 90%, which conversions and selectivities have been found to be substantially consistent without deterioration and carbonization of the catalyst system employed.

The invention is further illustrated by the following examples, the parts and percentages specified being given by weight.

EXAMPLE I

The reactor employed in these experiments comprised a vycor tube having an interior diameter of 19 millimeters and being 103 millimeters in length with a 6 millimeter outside diameter thermowell down the center of the tube. The bottom portion of the reactor was packed with 150 cc. of catalyst. The section immediately above the catalyst was packed with glass beads, the glass beads serving as the vaporization zone for the feed materials. The tube was inserted into two electrical heaters so that the temperature of the catalyst bed could be controlled independently of the vaporization zone.

The adipic acid was charged to the reactor in the form of diammonium adipate dissolved in aqueous ammonia. The diammonium adipate was 23% by weight of the solution. This solution was then pumped at a rate of 0.5 gram per minute into the top of the vycor tube wherein it was vaporized and then passed over the catalyst bed. Additional ammonia was metered, sent to the top of the vycor tube, passed through the vaporizer and onto the catalyst bed. The mole ratio of ammonia to adipic acid entering the reactor was about 30:1.

In this example, the catalyst employed was tribasic calcium phosphate and the temperature of the catalyst bed was maintained at about 600° F. After completion of the reaction, the products were condensed and analyzed by means of a vapor chromatograph.

The conversion of the adipic acid to adiponitrile and by-products was found to be about 78%. The selectivity to adiponitrile was about 90%. The selectivity loss to cyclopentanone, an intermediate, was about 6.0%. The selectivity loss in converting part of the adipic acid to 5-cyanovaleramide and 5-cyanopentanoic acid were considered as adipic acid in computing the selectivity and conversion values.

EXAMPLE II

In this example, tribasic calcium phosphate was employed as the catalyst and the temperature of the catalyst bed maintained at about 646° F. The conversion of the adipic was about 88% with selectivity to adiponitrile being 91%. Selectivity loss due to the formation of cyclopentanone was about 7%.

EXAMPLE III

In this example, calcium pyrophosphate was employed as the catalyst with the temperature of the bed being maintained at about 608° F. The conversion of the adipic acid was about 81% with selectivity to adiponitrile being 93.5%. Selectivity loss to cyclopentanone was about 2.5%.

EXAMPLE IV

In this example calcium pyrophosphate was also employed as the catalyst with the temperature of the bed maintained at about 650° F. The conversion of adipic acid was 85% with the selectivity to adiponitrile being 95%. The selectivity loss to the formation of cyclopentanone was about 1.6%.

It is to be appreciated that the novel reaction, as disclosed herein, is subject to variations both in the particular reactants employed and in the amounts of these reactants. For example, various forms of the adipic acid starting material may be employed as well as the ratio of ammonia to the adipic acid and to the forms of calcium phosphate catalyst employed. However, these variations are considered to be within the ambit of persons skilled in the art and represent obvious embodiments of this invention.

What is claimed is:

1. In a vapor-phase process for producing adiponitrile by reacting a member selected from the group consisting of adipic acid, diammonium adipate and mixtures thereof with ammonia, the improvement which comprises conducting the reaction in the vapor phase in the presence of a molar excess of ammonia of about 30:1 in the presence of a catalyst selected from the group consisting of tricalcium phosphate, calcium pyrophosphate and dicalcium phosphate at a temperaure of about 500° to 800° F.

2. The improvement of claim 1 in which said adipic acid is in the form of diammonium adipate.

3. The improvement of claim 2 in which said ammonia is in aqueous solution and said diammonium adipate is dissolved therein.

4. The improvement of claim 3 in which said diammonium adiphate is 23% by weight of said aqueous ammonia solution.

5. The improvement of claim 4 in which said vaporized diammonium adipate and said vaporized ammonia react at a temperature of 575° to 675° F.

6. The improvement of claim 5 in which said reaction occurs at atmospheric pressure.

7. The improvement of claim 6 in which said calcium phosphate catalyst is tricalcium phosphate.

8. The improvement of claim 6 in which said calcium phosphate catalyst is calcium pyrophosphate.

9. The improvement of claim 6 in which said calcium phosphate catalyst is dicalcium phosphate.

References Cited

UNITED STATES PATENTS

| 2,132,849 | 10/1938 | Greenewalt et al. | 260—465.2 |
| 2,273,633 | 2/1942 | Fluchaire et al. | 260—465.2 |
| 2,668,175 | 2/1954 | Reppe et al. | 260—465.2 |

FOREIGN PATENTS 940,294   3/1956   Germany.

JOSEPH P. BRUST, *Primary Examiner.*

U.S. Cl. X.R.

260—465.4, 586